A. E. SQUYARS.
AUTOMATIC AIR COUPLING.
APPLICATION FILED AUG. 21, 1908.
929,511.
Patented July 27, 1909.
2 SHEETS—SHEET 1.
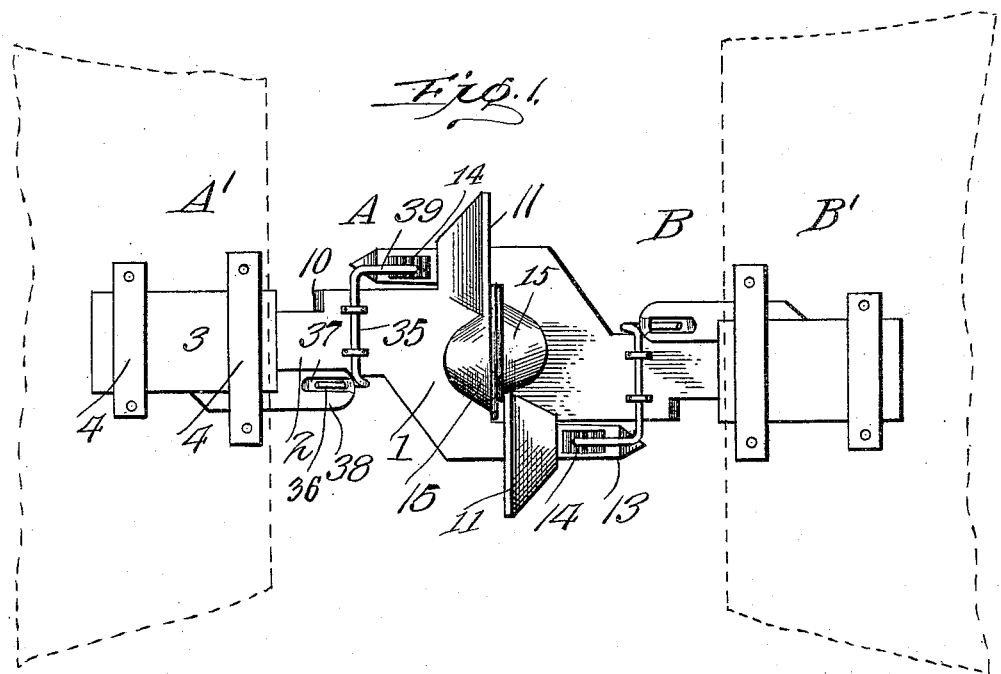
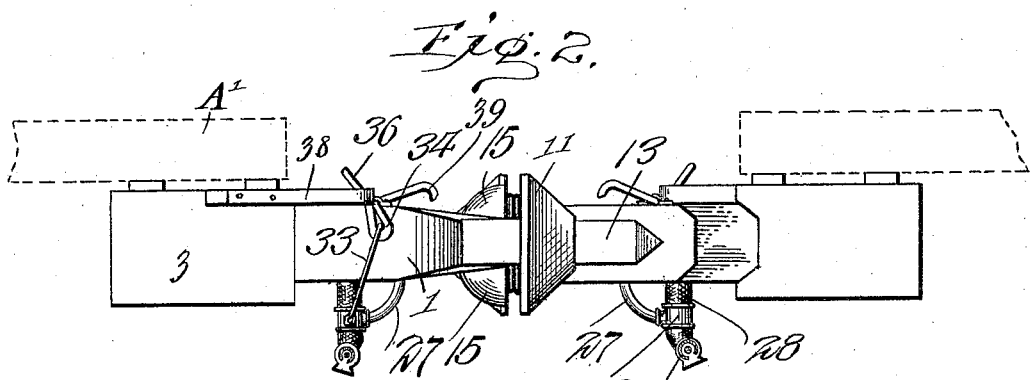
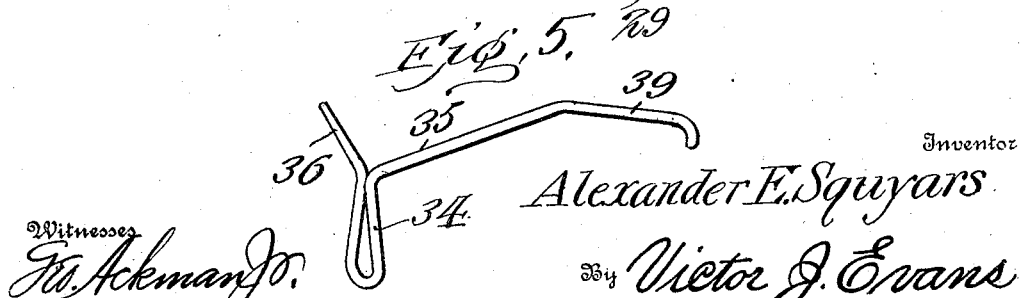
Witnesses
Geo. Ackman Jr.
C. C. Hull.
Inventor
Alexander E. Squyars
By Victor J. Evans
Attorney

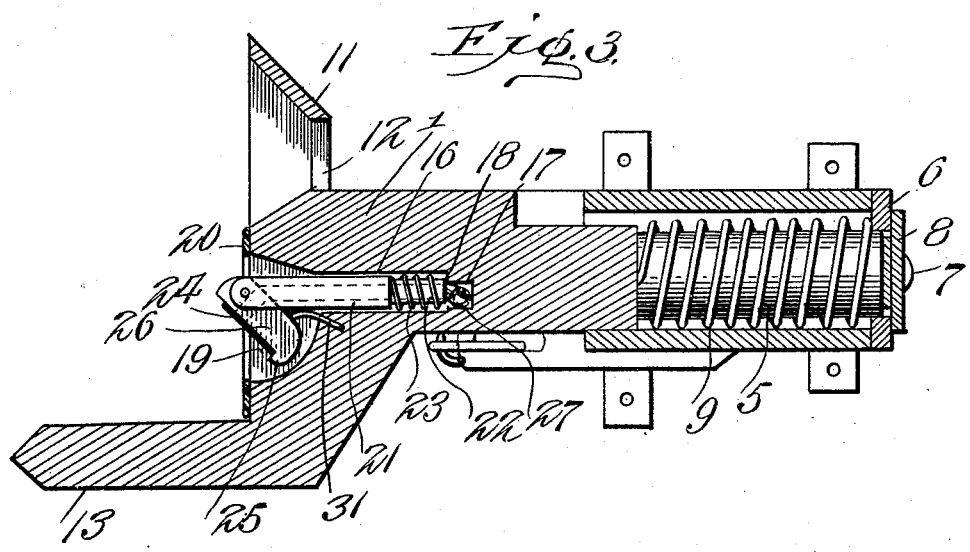
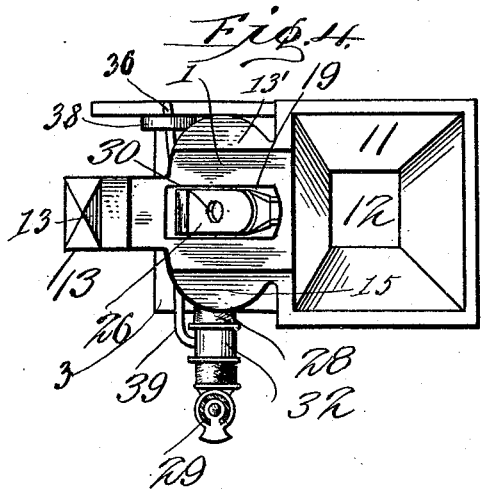

UNITED STATES PATENT OFFICE.

ALEXANDER E. SQUYARS, OF LAURINBURG, NORTH CAROLINA, ASSIGNOR OF ONE-HALF TO MALCOLM G. McKAY, OF LAURINBURG, NORTH CAROLINA.

AUTOMATIC AIR-COUPLING.

No. 929,511.  Specification of Letters Patent.  Patented July 27, 1909.

Application filed August 21, 1908. Serial No. 449,636.

*To all whom it may concern:*

Be it known that I, ALEXANDER E. SQUYARS, a citizen of the United States, residing at Laurinburg, in the county of Scotland and State of North Carolina, have invented new and useful Improvements in Automatic Air-Couplers, of which the following is a specification.

This invention relates to automatic air brake couplers for railway cars, the object of the invention being to provide a coupling which is adapted to automatically interlock with an opposing coupling, and which is provided with means for securing a close connection between the coupling head thereon and the coupling head of the opposing coupling to effectually prevent leakage of air.

A further object of the invention is to provide a coupling having novel locking means for connecting the engaging member of the opposing coupling thereto, and which is adapted to be automatically released to permit separation of the coupling devices when the ordinary draft couplers on the cars are disengaged.

With these and other objects, the invention consists of the features of construction, combination and arrangement of parts hereinafter fully described and claimed, reference being had to the accompanying drawings, in which:—

Figure 1 is a top plan view showing two opposing couplers connected, and indicating in dotted lines the end portions of the cars carrying the couplings. Fig. 2 is a side elevation of the same. Fig. 3 is a horizontal transverse section through one of the couplings. Fig. 4 is a front elevation of the same. Fig. 5 is a detail view of the crank shaft.

Referring to the drawings, the letters A and B designate opposing couplings mounted upon the adjacent end portions of the cars A' and B'. The couplings are arranged in the ordinary manner in rights and lefts upon the opposite ends of each car, but are otherwise alike in construction, so that a description of one will suffice for both.

The coupling comprises a body or abutting head 1, provided at its inner or rear end with a shank 2 of angular form to slidably fit within a guide sleeve or casing 3 mounted upon the under side of the car and secured thereto by cross bars or brackets 4 perforated for the passage of bolts or other fastening devices. The shank is provided at its rear end with a cylindrical stem 5 which is movable through an opening in a bridge plate 6 secured to the inner end of the casing 3, and has suitably attached thereto, as by a fastening screw 7, a stop plate 8 adapted to abut against the bridge plate and to limit the forward movement of the coupling and hold the shank from withdrawal. A coiled cushioning spring 9 surrounds the stem 5 between the inner end of the shank and the bridge plate and permits the coupling to yield for coupling action, and also cushions the movement of the coupler to adapt it to effectually withstand the strains to which it is subjected. The rearward movement of the coupler is limited by a stop shoulder 10, at one side of the shank, which is adapted to abut against the front end of the casing.

Arranged at one side of the body 1 is a flaring keeper guide 11, which projects laterally therefrom and is preferably of hopper form and provided in its rear or reduced end with a guide opening 12, and projecting forwardly from the other side of the body is a locking arm 13 provided on its upper side with a plurality of rack teeth 14. The keeper guide 11 is adapted to receive the corresponding locking arm upon the opposing coupling, while the locking arm upon the coupling in question is adapted to be received by the keeper guide on said opposing coupling, the arms extending through the guide openings in the keepers, as shown in Figs. 1 and 2.

The body or abutting head 1 of the coupler is in the form of a flat angular plate formed at the front with bosses 15 upon its upper and lower faces to provide an abutting surface of proper area to bear against the corresponding surface of the opposing coupling. In the head is formed a longitudinal channel 16 formed at its inner end with a reduced portion or receiving pocket 17 and adjacent thereto with a shoulder 18, the outer or forward end of the channel communicating with a flaring chamber or recess 19 opening through the abutting surface of the body, which latter is provided around the opening with an elastic sealing disk 20 to bear against a corresponding disk on the cooperating coupling to form a close joint between the couplings.

A yielding tubular carrier rod or bar 21 is mounted for sliding movement in the channel 16 and projects at its forward end within and beyond the recess 19. At its rear end said bar is formed with a reduced portion 22, and between the shoulder formed by said reduced portion and the shoulder 18 is arranged a coiled cushioning spring 23, surrounding said reduced portion and adapted to permit the bar to have an inward yielding movement and to project the same forward when pressure is removed therefrom. A coupling head 24, comprising an oblong rectangular block, is pivoted at one end and in rear of its outer face upon the forward end of the carrier bar and is normally arranged to lie at an oblique angle in the recess 19 and to project at its pivoted end slightly therefrom. The outer face of this head is provided at its free end with a shoulder 25 and has a facing 26 of rubber or other suitable sealing material to form an airtight connection with the counterpart face of a similar coupling head upon an opposing coupler connected therewith.

An air conducting tube 27, of flexible material, extends laterally through one side of the body into the pocket or recess 17, and thence downwardly through the bottom of the body and is connected at its outer end with a hose or conductor 28 suitably secured to the body and provided with the ordinary type of coupling device 29 for connection with the hose pipe leading from the ordinary train pipe. The inner end of the tube 27 extends through the tubular carrier 21 and into the pivoted coupling head 24, which latter is provided with an opening 30 extending through its face and communicating with said tube. When the two cars A' and B' come into coupling engagement, the abutting surfaces of the two coupling devices thereon contact and effect a fluid tight connection through their sealing facings, and the locking arm 13 of each coupling passes through the flaring guide 11 on the opposing coupling, as will be readily understood. When the draft couplings of the cars are in engagement the automatic air couplers are held pressed inward to their full extent, or practically so, against the resistance of their cushioning springs 9, which permit the shanks to recede into the guide casings 3. When the couplers abut, the meeting faces of their coupling heads, which are arranged in reversed relation, contact and are forced rearwardly into the recesses 19, which movement is permitted by the rearward movement of the carrier bars against the resistance of the springs 22, and the shoulder 25 of each coupling head engages the pivoted end of the other coupling head, thus retaining them in engagement against lateral play or movement. It will be understood that the pivotal mounting of the coupling heads adapts them to accommodate themselves to each other to lie in close abutting engagement, which action is promoted by the yielding movement of the carrier bars. The openings 30 in the coupling heads will then be in communication, for the passage of air from one coupler to the other. A spring 31 is arranged within the channel 16 or recess 19 to allow the carrier bar and coupling head to have a limited lateral movement and to limit such movement.

The hose or conductor 28 is provided with a controlling valve 32 adapted to open or close communication between the same and the tube 27, and to the outer end of the stem of this valve is connected the lower end of a crank arm 33, the upper end of which pivotally engages a looped offset portion 34 on one end of a rock shaft 35 which extends across and is journaled in bearings on the top of the front end of the shank 2. The looped end of this rock shaft is extended to form an upwardly and rearwardly inclined crank arm 36 which projects upwardly into a guide slot 37 in an arm or projection 38 extending forwardly from the adjacent side of the casing 3. This arm serves as an operating or controlling device for the crank shaft. When the coupling is forced forward to its normal position by the spring 9, the crank 36 contacts with the front end wall of the slot 37, by which the shaft 35 is rocked in an upward and rearward direction, and actuates the crank arm 33 to close the valve 32. When the coupling is forced rearwardly against the resistance of the spring 9, the crank 36 engages the rear end wall of the slot 37 and rocks the crank shaft forwardly and downwardly, thus actuating the crank 33 to open the valve 32. On the end of the shaft opposite the crank arm 36 is formed a locking tongue or projection 39 having a downturned or hooked free end to engage the locking teeth or notches 14 on the locking arm 13 of the opposing coupling. This locking tongue is thrown downward into engagement with the locking arm 13 when the couplings come together and the crank 33 is simultaneously actuated to open the valves 32. This operation takes place on both coupling devices to lock them together and to open the valves to connect the two hose pipes 28 for the flow of air through the couplings, such position of the parts being maintained as long as the couplings are held in engagement with each other by the connection of the cars through their draft couplings. When the draft couplings are disengaged and the cars separate, the springs 9 of the couplers force them outward to normal position, and through the above described operation of the parts the locking members 39 will be retracted and the valves 32 closed. When the air couplings come together the opposing coupling heads 26, by reason of their pivotal connection with the couplings on opposite sides of the central longitudinal line thereof assume a straight transverse or right angular position to the couplings and are thus maintained in close abutting contact for the passage of air without leakage.

From the foregoing description, the construction and mode of operation of my improved automatic air coupling will be readily understood, and it will be seen that it provides a simple and effective device of this character which is positive in action and adapted to interlock with an opposing coupling in a secure manner.

Having thus fully described the invention, what is claimed as new is:—

1. An automatic air brake coupling comprising a yieldingly mounted body provided with a keeper guide at one side and a locking arm at its opposite side, a coupling head yieldably mounted upon said body between said guide and arm, an air supply pipe leading thereto and provided with a controlling valve therein, a valve controlling device, a locking device to engage the arm of an opposing coupling, said devices being connected for movement in unison, and means controlled by the movements of the body for simultaneously operating said valve controlling and locking devices.

2. An automatic air brake coupling comprising a yieldingly mounted body provided with a keeper guide at one side and a locking arm at its opposite side, a coupler head yieldably mounted on the body between the guide and arm, an air conductor leading thereto and provided with a controlling valve, a rock shaft journaled on the body and provided with a locking arm and operatively connected with the valve, and means actuated by the reverse movements of the body for rocking said shaft in reverse directions to project and retract the locking member and to open and close the valve.

3. An automatic air brake coupling comprising a yieldingly mounted body provided at one side with a keeper guide and at its opposite side with a toothed locking arm, a coupling head yieldingly mounted on the body between said keeper guide and locking arm, a valved conductor communicating therewith, a rock shaft journaled on the body and provided with a locking portion to engage the locking arm of an opposing coupling and provided with an actuating arm, a connection between said shaft and the valve in the conductor, and means acting on said actuating arm for rocking said shaft in reverse directions in the back and forth movements of the body to simultaneously project and retract the locking portion and to open and close the valve.

4. An automatic air brake coupling comprising a yieldingly mounted body provided at one side with a keeper guide and at its opposite side with a locking arm, a coupling head yieldingly mounted on said body between said guide and locking arm, a valved conductor communicating therewith, a rock shaft journaled on the body and having a locking portion to engage the locking arm of an opposing coupling and an actuating arm, a connection between said shaft and the valve in the conductor for opening and closing said valve when said locking portion is projected and retracted, and a stationary actuating device engaged by the actuating arm of the shaft for rocking said shaft in reverse directions upon the reverse movements of the body.

5. An automatic air brake coupling comprising a yieldingly mounted body provided with a keeper guide at one side and a toothed locking arm at its opposite side, a coupler head yieldingly mounted on the body between said keeper guide and locking arm, a valve conductor communicating therewith, a crank shaft having an actuating crank arm and a locking arm, said locking arm being adapted to be engaged with the locking arm of an opposing coupling, a valve actuating crank connected with the valve of the conductor and pivotally connected with the shaft for actuation thereby, and a stationary slotted projection receiving said actuating arm and adapted to move the same in reverse directions upon the forward and backward movements of the body to simultaneously project the locking arm and open the valve and to simultaneously retract said arm and close said valve.

6. An automatic air brake coupling comprising a spring controlled yieldingly supported body, guiding and locking means upon the body to engage coöperating means upon an opposing coupling, a locking device upon the body to engage the locking means upon the opposing coupling, a yieldingly mounted tubular carrier upon the body, a coupling head pivotally connected therewith, a flexible conductor extending through the carrier and connected with the head, a valve controlling the flow of air therethrough, a valve operating device, and means for automatically and simultaneously actuating said locking and valve operating devices.

In testimony whereof I affix my signature in presence of two witnesses.

ALEXANDER E. SQUYARS.

Witnesses:
D. A. GILCHRIST,
C. L. McCoy.